Jan. 14, 1936.   H. FANKBONER   2,027,524
METHOD AND APPARATUS FOR PREPARING STEREOTYPE MATRICES
Filed Dec. 4, 1931   4 Sheets-Sheet 1
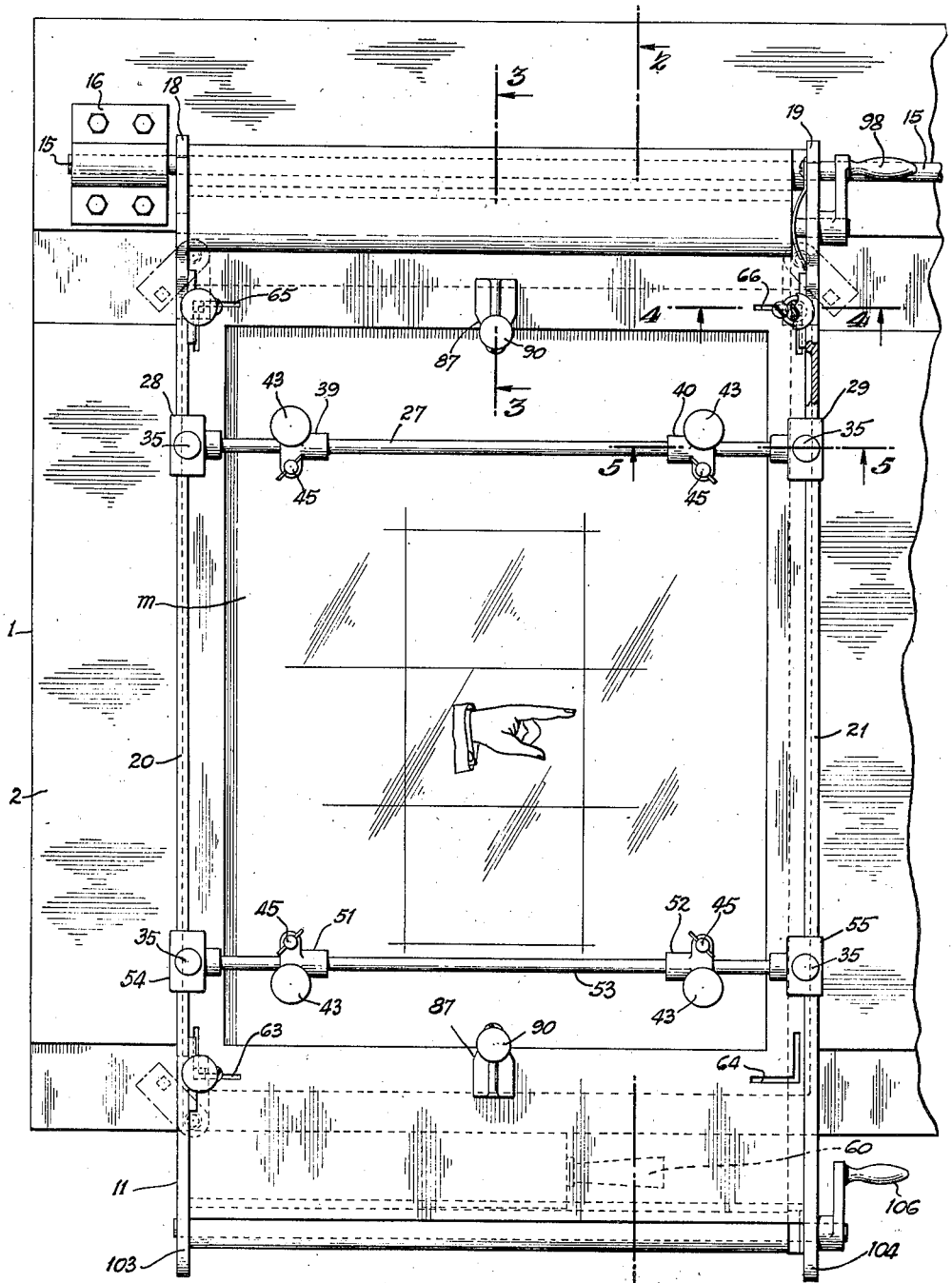

Jan. 14, 1936. H. FANKBONER 2,027,524
METHOD AND APPARATUS FOR PREPARING STEREOTYPE MATRICES
Filed Dec. 4, 1931 4 Sheets-Sheet 2
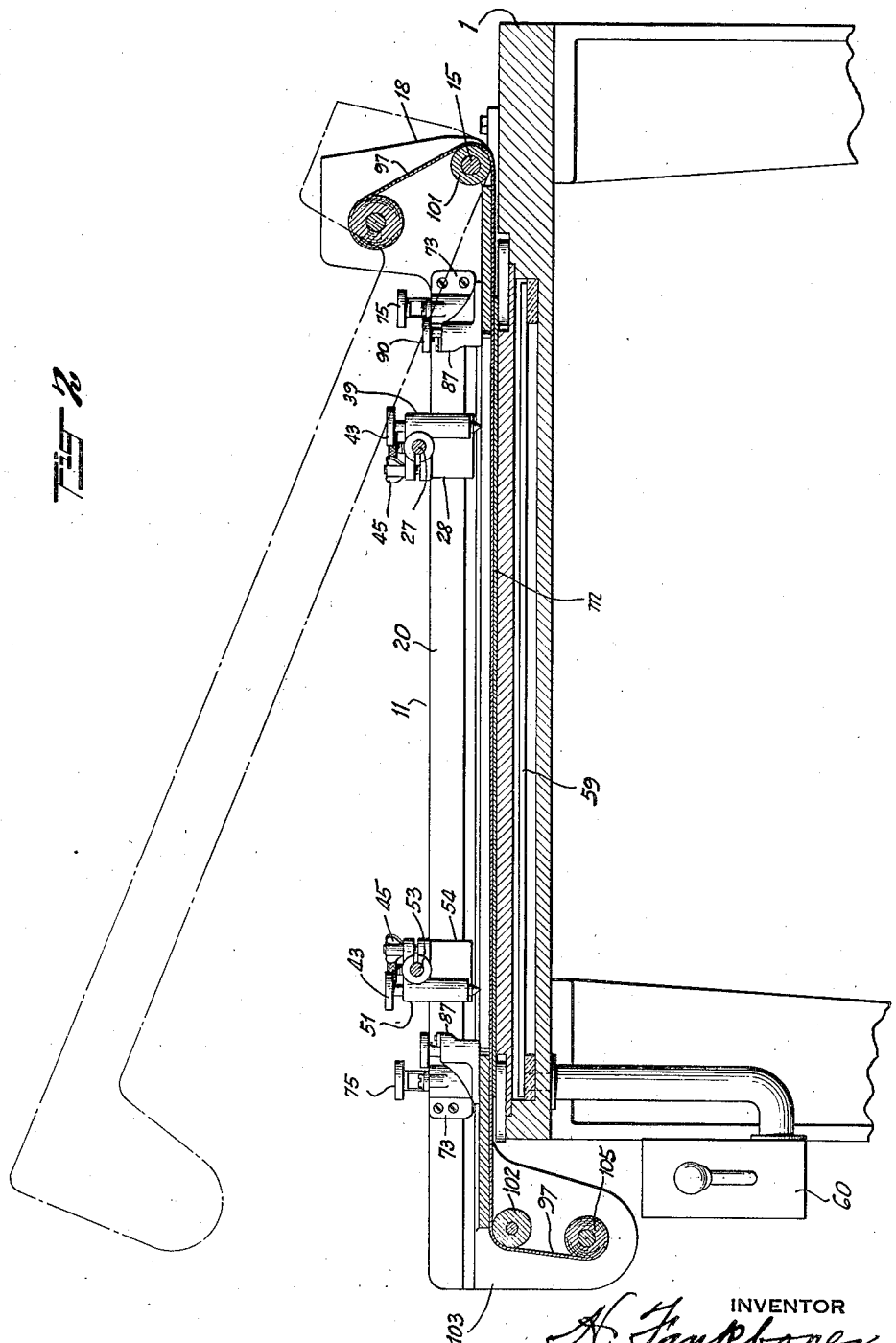

Jan. 14, 1936.   H. FANKBONER   2,027,524
METHOD AND APPARATUS FOR PREPARING STEREOTYPE MATRICES
Filed Dec. 4, 1931   4 Sheets-Sheet 3
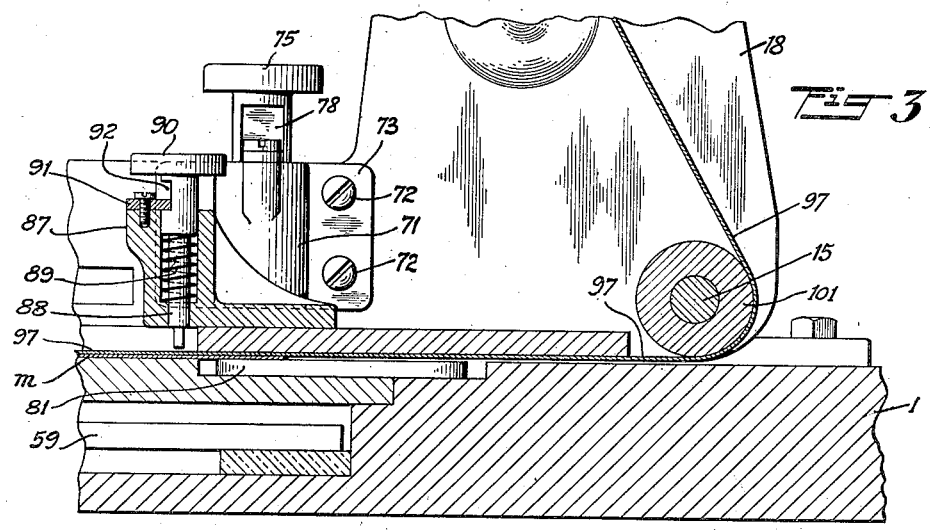
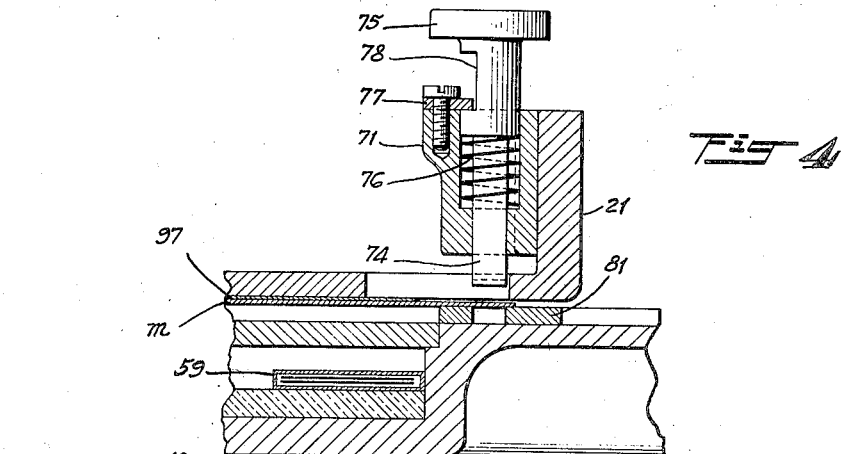
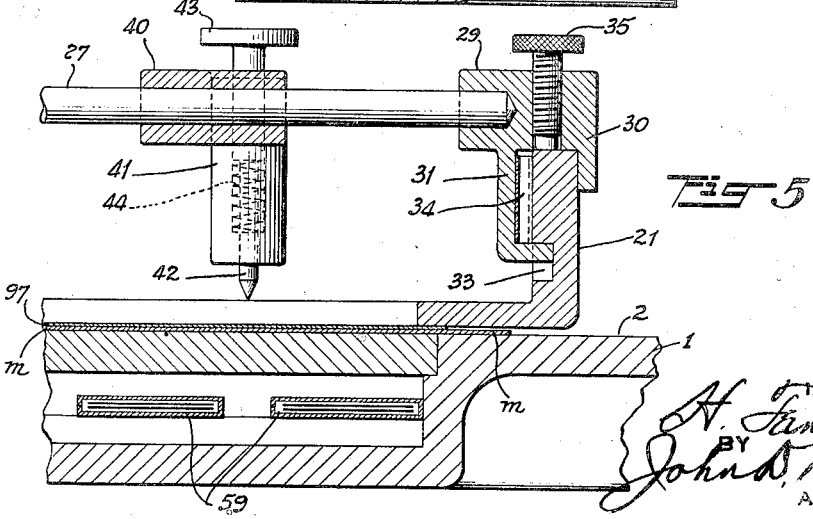
INVENTOR
H. Fankboner
BY John D. Morgan
ATTORNEY Jan. 14, 1936.  H. FANKBONER  2,027,524
METHOD AND APPARATUS FOR PREPARING STEREOTYPE MATRICES
Filed Dec. 4, 1931  4 Sheets-Sheet 4
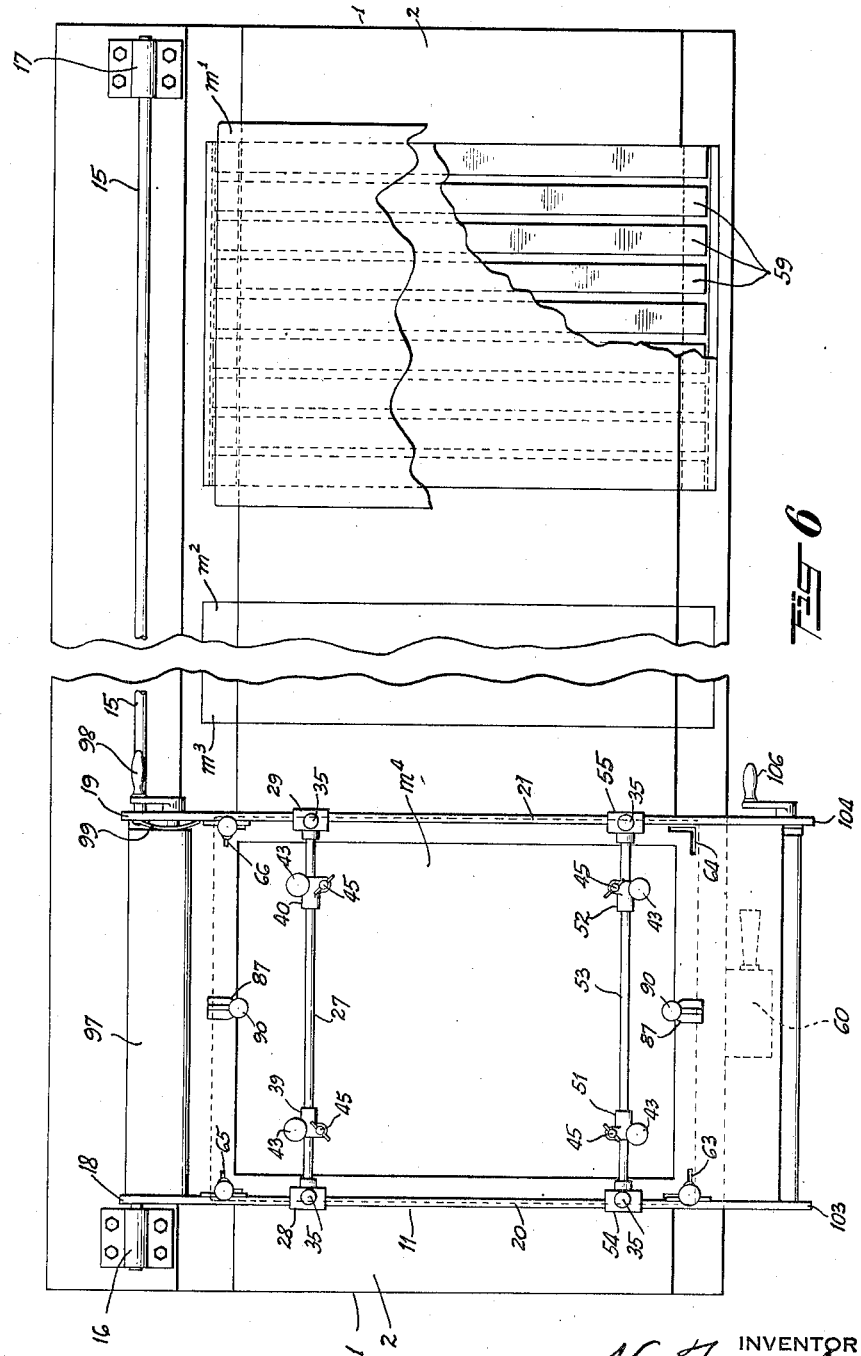

Patented Jan. 14, 1936

2,027,524

UNITED STATES PATENT OFFICE 2,027,524

METHOD AND APPARATUS FOR PREPARING STEREOTYPE MATRICES

Harland Fankboner, Chicago, Ill., assignor to The Goss Printing Press Company, Chicago, Ill., a corporation of Illinois Application December 4, 1931, Serial No. 578,914
In Great Britain September 25, 1931

REISSUED

21 Claims. (Cl. 33—184.5)

The present invention relates to novel and useful improvements in method and apparatus of making and preparing multi-color stereotype matrices, and more particularly to a novel apparatus and method for treating multi-color stereotype matrices to produce therefrom a uniform set of color plates.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Figure 1 is a detail fragmentary plan view of the present preferred and illustrative embodiment of the invention;

Figure 2 is a cross-section taken on the line 2—2 of Figure 1;

Figure 3 is a greatly enlarged fragmentary detail cross section taken on the line 3—3 of Figure 1;

Figure 4 is a greatly enlarged fragmentary detail section taken on the line 4—4 of Figure 1;

Figure 5 is a greatly enlarged similar section taken on the line 5—5 of Figure 1; and Figure 6 is a broken plan view showing the apparatus as a whole.

The invention is directed to a method and mechanism for producing and treating a set of matrices carrying the designs for the various superposed colors for multi-color printing, so that the matrices will be exactly the same size, for providing all the matrices with mutually registered means for identically positioning them in the casting mechanism to effect accurate positional relation therein of the pre-sized designs on their respective plates, and also for providing the matrices with means for marking the stereotype plates of the set during casting so that they in turn may be exactly registered in the finishing machines, all to the end of producing perfect color work by rotary stereotype printing.

By my invention, the set of matrices, as for instance, those for the blue, red, yellow and black used in four color work, are subjected to exact mutual gauging or registering; that is, they are either averagely registered to the gauging or alining means, or are brought to exactly the same size. When so mutually registered, the matrices are marked or shaped so that they will cooperate with devices on the casting mechanism and thereby will be exactly registered in the casting box, and thus all of the either averagely registered or presized designs, on the respective matrices will be cast in exactly the same position on their respective color plates. While the matrices are thus mutually positioned and gauged, there are likewise made therein, in accurate registry, marks reproducible in casting. Such registered marking will be cast in all the plates of the set, to the end that the plates may be accurately registered in the finishing machine. This feature of the invention is also fully and independently applicable apart from the step of presizing the matrices just described. In the event that the presizing is omitted, and instead the designs on the different matrices are equalized, or averaged, that is, are brought as near complete mutual registration as possible without the presizing, these cast marks will also bring the different plates into register in the finishing machine.

The presizing operation may be employed with matrices received directly from the molding machine, and also with matrices which have been roasted but are capable of further slight shrinkage. In the former case, the mechanism and process of the present invention effect the roasting and the presizing or equalization as one operation; and the matrices from the molding machine may be roasted to size by the gauges of my present mechanism. With the previously roasted but still somewhat shrinkable matrices, if any of the matrices are over-sized, heat is applied to shrink them, under the gauge tests, to the exact size of the smallest matrix. Perforations are then made in all of the uniformly sized matrices, which are in exact register in all the matrices, and these register with projections on the casting chamber. All the pre-sized matrices, with designs of exactly the same size, are thus mutually registered in the casting chamber and the page designs are thereby cast in exactly the same positional relation with respect to the finished ends and straight sides of each of the respective plates. To bring the plates into exact mutual register in the finishing machine, preparatory to finishing, a registering mark is cast in each plate, which is later registered with an alining device in the finishing machine. For this purpose such marks, adapted for stereotype reproduction, are impressed in registered relation in each of the matrices, and are thus cast in the same relation in each of the plates. Such marks in each plate will register with corresponding marks on the finishing machine, thereby insuring identical finishing and shaping of all the plates in the set, and bringing the designs of the various plates into the same positional relation to their edges, respectively.

The invention provides also for making a permanent record of the page size, the exact location of the registry marks and casting indentations for each matrix, so that, in case of wear, accident, or the like, or from other cause, exact replicas of the matrix may be made, and the stereotypes cast therefrom will register with the other plates of the color set as exactly as did the plates made from the original matrix.

My invention provides also, as will be clear from the foregoing, a novel and highly useful set of matrices having the functions and characteristics previously described.

The foregoing general description, and the following detailed description as well, are illustrative and exemplary but are not restrictive of the invention.

Referring now in detail to the present preferred embodiment of the invention, illustrated by way of example in the accompanying drawings, a table 1 is provided having a top surface 2 adapted to receive in side-by-side, or other serial, positional relation the entire set of matrices, say the four matrices employed in four-color work, preparatory to the process of bringing the matrices to the same size, and to making in or on them the registering marks and devices for securing their accurate mutual positioning and registering in the casting chamber and in the finishing machine. A broken plan view of the table is shown in Fig. 6, the matrices being indicated diagrammatically as $m^1$, $m^2$, $m^3$ and $m^4$.

The embodied form of means for measuring or gauging the matrices of the color set, and for applying thereto the different measuring and registration marks, comprises a carriage 11, whereon is mounted the various devices for effecting the aforementioned functions. The carriage is adapted to move above and along the series of matrices upon the table 1 and also to move away from above the matrices, thereby to permit easy access for the insertion and withdrawal of the same. As so embodied, carriage 11 (Figs. 1, 2, 3 and 6) comprises a four-sided frame, the opening of which will expose at least the full page size of the matrices when the frame is positioned thereover. To effect the described movements of the frame, it is mounted for slidable movement along and over the table upon a rod 15, which rod extends longitudinally at the back of the table 1, and is supported at either end in brackets 16 and 17 fixed to the top of the table. Rear extensions 18 and 19 of the frame 11 are apertured to take the rod 15, the frame thus being supported on the rod and slidable along the table, and also swingable upwardly and backwardly, away from the surface of the table, as shown in broken lines in Fig. 2.

In the embodied form of gauging and marking means for use in bringing all the matrices of a particular color set to exactly the same size, a plurality of gauging or indicating devices are employed, to indicate the page corners, or any selected corresponding points on all the matrices. In practice I preferably employ four such devices. In such embodied form, two guideways 20 and 21 are fixed to, extend upwardly from, and are disposed along the top of the side edges of the frame 11. The gauging devices, or points, for mechanical convenience are mounted in pairs. For one of the pairs, supported on the guides 20 and 21, so as to be slidable therealong, is a rod 27 mounted at either end in supporting blocks 28 and 29 (Figs. 1, 2, 5 and 6). Each block 28 and 29 (Fig. 5) is recessed so as to rest on top of the corresponding guides 20 and 21, and has a flange 30 extending downwardly and slidable on the outside of the guide. It has also a flange 31 extending downwardly on the inside of the guide, with its lower end angled inwardly and projecting into and sliding within a longitudinally-disposed groove 33 in the guide. A flat spring 34 is positioned between the flange 31 and the inner face of the guide to prevent play of the parts, while allowing the necessary slidable action. A clamping screw 35 is threaded into the top of each supporting and guiding block 29 to clamp the rod 27 in the set position.

To permit movement of the two gauging devices along their rod 27, a pair of gauge carrying blocks 39 and 40 are slidably mounted on the rod. Each of these blocks has a downwardly-extending portion 41 within which is mounted a spring-actuated marking pin 42, having a head 43, the pin being resiliently held in retracted position by a spring 44, mounted within the part 41. Pressure on the head 43 of the pin will depress it and cause it to mark the matrix or give a positional indication with respect thereto. A clamping screw 45 serves to fix the device in exact position on the rod 27. In the present preferred use of four of the gauging devices, another pair 51 and 52 are supported upon and transversely slidable along a cross rod 53 similar to rod 27, and which in turn has its ends supported in guide blocks 54 and 55, similar to guide blocks 28 and 29, and which are, in like manner, slidably mounted on the guides 20 and 21. All of these are constructed and operate in like manner to the devices already described and need not be further described in detail.

The marking devices afford accurate means either for averagely registering or for substantially exactly sizing the matrices of any given color set. The pins 42 are exactly positioned at the four corners, or at any other key points common to all the matrices, and are then fixed in position upon the respective rods 27 and 53, and furnish an exact size gauge for all the matrices, the carriage being slid along from one matrix to the other for this purpose. The various matrices of the set may be thereby averagely registered, that is, the images on the various mats may be brought into the closest average mutual register with the alining devices, with or without roasting or drying in the present mechanism, which is capacitated to carry out either treatment. They are thus in a suitable condition to receive the registering marks which are reproduced in the plates and are used to mutually aline the plates in the trimming machine.

As embodied, individual drying means are provided for each of the matrix positions of the machine. These may be used to roast the matrices coming from the moulding machine and to concurrently bring them to the same or average size and registration by controlled application of heat; or to shrink some of the previously roasted matrices to a smaller standard size, usually that of the smallest matrix of the set. The original differences in size are, of course, very small.

Whenever the final registration is effected by averagely registering all the mats of the set, the heating devices may be dispensed with if desired. When the mechanism is employed to shrink some or all of the mats, whether previously roasted or not, by the application of just sufficient heat, each matrix may be shrunk until the gauging members 42 indicate that it is exactly the size of the standard matrix. The embodied form of heating means (Figs. 2, 5 and 6) comprises a group of electrical heating elements 59, mounted in the table 1 beneath the respective matrix locations, and these heaters may be of any standard or other suitable construction. Each of the heating devices 59, at the respective loci of the matrices, is controlled by its own switch 60 whereby the operator can apply just the exact amount of heat desired to effect the requisite treatment as previously described.

Means are provided for marking the edges of the mutually sized matrices for trimming, and as embodied (Figs. 1 and 6) there are formed in the frame 11, right-angled slots 63, 64, 65 and 66, corresponding to the four corners of the matrix, and after the matrix has been positioned and sized to the gauges 42, the corners may be marked for trimming by inserting a pencil, scribe, or the like, in the angled slots, and thereby marking the matrix corners for trimming.

In the embodied form of means for effecting identical positional registration of all the matrices of the color set in the stereotype casting chamber (Figs. 1, 4 and 6), means are provided for making a plurality of perforations in the positioned and sized matrix, which perforations engage or coact with corresponding projections in the casting mechanism. As embodied, three such devices are used, adapted to perforate the matrix just within three of its corners. In the embodied form thereof, a block 71 is supported on the inner face of the guides 20 or 21 by suitable means such as screws 72, passing through a flange 73 formed on the block. Within the block is mounted a reciprocable spring-pressed punch 74, having a head 75 and a compression spring 76 within the block. A stop 77 working in a recess 78 in the shank of the plunger limits the movement thereof. Cooperating with the punch 74 is a die block 81, which is preferably pivotally mounted in a suitable recess in the table 1, and is optionally swingable into and out of punching position, the inner side of the recess alining it for the punching operation. If desired, the punched-out portion of the matrix may open into the edge of the sheet.

Means are likewise provided by the invention for marking the matrix sheet to produce registering marks cast in the stereotype plates, and which will provide means for registering all the plates of the set in the finishing machine preparatory to trimming and shaping. In the embodied form of such means (Figs. 1, 2, 3 and 6), two such devices for embossing a design in the matrix, preferably near the head and tail thereof, are provided. As embodied, a supporting block 87 is fixed on the corresponding cross-reach of the frame 11, and reciprocably mounted therein is an embossing punch 88, held in retracted position by a compression spring 89, and having an actuating head 90. A stop 91 fixed on the block 87 projects into a recess 92 in the shank of the punch to limit its movement. These devices may be used irrespective of whether the matrices are shrunk to uniform size or whether the designs on the different matrices have been equalized without the shrinking operation.

The embodied form of means for preserving a record of the size, and of all the registering means of each matrix, so that complete data for the making of replicas thereof are practically instantly available, comprises (Figs. 1, 2, 3 and 6) a roll 97 of transparent paper, or the like, mounted in upwardly projecting portions of the lugs 18 and 19, which carries the roll of transparent paper and is provided with a winding handle 98, and a suitable friction spring 99 to prevent loose unwinding. The paper 97 passes about a roller 101, mounted on the rod 15 between the projections 18 and 19 of the frame, thence passes beneath the frame 11, over the matrix (Figs. 2 and 3) and thence over a guide roller 102, mounted in downwardly projecting ears 103 and 104 formed on the front cross reach of the frame 11. A winding roller 105 is likewise mounted in the members 103, 104 and is provided with a winding handle 106. All of the positional, sizing and registering marks made in any particular matrix are thus concurrently made also in the transparent paper web 97, and constitutes a permanent record for that matrix. The identification of the matrix can, of course, be written on the sheet.

It will be understood that with the concomitant gauging and marking of the transparent sheet 97 and the matrix, there is recorded and preserved in the sheet the complete data for the size and location of the design upon the matrix, the relative position of the registration marks for the casting chamber, and also for the finishing machine, and this data, properly identified, is then stored by winding it upon the roller 105. When for any reason a replica of the matrix is required, all of this data is rendered available for use in making such replica by winding the transparent web 97 in the opposite direction. Thereby the part of the web 97 containing the data for the matrix to be reproduced is again brought into operative relation with the frame 11 and its gauging and registering devices. In this work of reproducing a matrix (usually one of a color set) of the exact size of the other matrices of the set, the portion of the web 97 marked at the time of the preparation of the original matrix now becomes a part of the apparatus or instrumentality required for making the replica matrix, and the devices on frame 11 are set by the indications of sheet 97. The new matrix can be shrunk to the indicated size in the manner already described and the design brought to the exact common or mutual relation with the other matrices of the set.

The invention in its broader aspects is not limited to the specific mechanisms shown and described but departures may be made therefrom within the scope of the accompanying claims without departing from the principles of the invention and without sacrificing its chief advantages.

What I claim is:—

1. The method of treating a set of matrices for casting multicolor stereotype plates which comprises applying gauging devices to the series of matrices and selectively applying heat to a matrix or matrices to bring them to the same size preparatory to casting the corresponding color plates therefrom.

2. The method of treating a set of matrices for casting multicolor stereotype plates which comprises applying gauging devices to the series of matrices and varying the size of said matrices to bring them to uniform size preparatory to casting the corresponding color plates therefrom, and then uniformly producing in the matrices of a color set a registering device cooperating with a corresponding device in the casting machine to identically position the designs on all the plates of the set.

3. The method of treating a set of matrices for casting multicolor stereotype plates which comprises applying gauging devices to the series of matrices and selectively applying heat to a matrix or matrices to bring them into registration with each other preparatory to casting the corresponding color plates therefrom, and then uniformly producing in the matrices of a color set a registering device cooperating with a corresponding device in the casting machine to identically position the designs on all the plates of the set.

4. The method of treating a set of matrices for casting multicolor stereotype plates which comprises applying gauging devices to the series of matrices and mutually registering said matrices and bringing them to uniform size preparatory to casting the corresponding color plates therefrom, and then uniformly producing in each matrix of the color set a registering device cooperating with a corresponding device in the plate finishing machine to effect uniform finishing in all of the plates of the set.

5. The method of treating a set of matrices for casting multicolor stereotype plates which comprises applying gauging devices to the series of matrices and registering their designs with each other preparatory to casting the corresponding color plates therefrom, then uniformly producing in the matrices of a color set a registering device cooperating with a corresponding device in the casting machine to identically position the designs on all the plates of the set and uniformly producing in each matrix of the color set a registering device cooperating with a corresponding device in the plate finishing machine to effect uniform finishing in all of the plates of the set.

6. The method of treating a set of matrices for casting multicolor stereotype plates which comprises applying gauging devices to the series of matrices and selectively applying heat to a matrix or matrices to bring same into registration with each other preparatory to casting the corresponding color plates therefrom, then uniformly producing in the matrices of a color set a registering device cooperating with a corresponding device in the casting machine to identically position the designs on all the plates of the set and uniformly producing in each matrix of the color set a registering device cooperating with a corresponding device in the plate finishing machine to effect uniform finishing in all of the plates of the set.

7. The method of treating a set of matrices for casting multicolor stereotype plates which comprises applying gauging devices to the series of matrices and selectively varying the size of one or more to bring them to uniform size preparatory to casting the corresponding color plates therefrom, then uniformly producing in each of the matrices of a color set a registering device cooperating with a corresponding device in the casting machine to identically position the designs on all the plates of the set and making in registered position on each matrix a mark which is reproduced in the casting of the plate, and which serves to uniformly position all the cast plates of the set in the finishing machine.

8. The method of treating a set of matrices for casting multicolor stereotype plates which comprises applying gauging devices to the series of matrices and selectively varying the size of one or more to bring them to uniform size preparatory to casting the corresponding color plates therefrom and then making in registered position on each matrix a mark which is reproduced in the casting of the plate, and which serves to uniformly position all the cast plates of the set in the finishing machine.

9. In a method of producing a finished set of multicolor stereotype plates comprising making a set of matrices for color printing, then uniformly producing in registered relation in the matrices of a color set a mark reproduced in the cast plates, and registering the stereotype plates of the color set by said cast marks for finishing.

10. In a method of producing a set of multicolor stereotype plates which comprises making a set of matrices for color printing, punching in said matrices in registered relation mutually registering holes, and positioning the matrices in the casting chamber by means of said registering holes to effect registered casting of the various color designs of the respective plates.

11. In a method of producing a set of multicolor stereotype plates which comprises making a set of matrices for color printing, making in said matrices in registered relation mutually registering devices, positioning the matrices in the casting chamber by means of said registering devices to effect registered casting of the various color designs of the respective plates, then uniformly producing in registered relation in the matrices of the color set a mark reproduced in the cast plates, and registering the stereotype plates of the color set by said cast marks for finishing.

12. In a method of reproducing one of a set of matrices for casting multicolor stereotype plates for color printing, the step of applying gauging and registering marks concurrently to the set of matrices and to a recording transparent medium which may be preserved for later reproduction of a matrix for one of the colors so that said reproduction will register with the previously made matrices.

13. A mechanism for treating sets of matrices for color printing including in combination a support for the matrices, gauging means for determining the relative size of the designs on the various matrices and optionally operable heating means underlying said support for bringing the matrices to a gauged size.

14. A mechanism for treating sets of matrices for color printing including in combination a support for the set of matrices, gauging means movable along the series of matrices, for determining the relative size of the designs on the various matrices and heating devices carried by said support for individual matrices for bringing the matrices to a gauged size.

15. A mechanism for treating sets of matrices for color printing including in combination a support for the set of matrices, a carriage movable along the series of matrices, gauging means on the carriage for indicating the relative size of the designs of the various matrices and means associated with said support for shrinking a matrix of larger size to a smaller gauged size.

16. A mechanism for treating sets of matrices for color printing including in combination a support for the matrices, a carriage movable along the series of matrices, gauging means on the carriage for indicating register of the designs, means for making perforations in registered relation on the matrices which cooperate with means on the casting mechanism for effecting mutual registration of the matrices in the casting chamber.

17. A mechanism for treating sets of matrices for color printing including in combination a support for the matrices, a carriage movable along the series of matrices, gauging means on the carriage for indicating registration of the designs with each other, means for punching registering devices in registered relation on the matrices which cooperate with means on the casting mechanism for effecting mutual registration of the matrices in the casting chamber, means for making in the matrices marks reproducible in the cast plates, and means for causing said marking means to impress in register with each other a series of matrices to correspondingly mark the cast plates to effect register thereof in a finishing machine.

18. A mechanism for treating sets of matrices for color printing including in combination a support for the matrices, gauging means for determining the relative size of the designs on the various matrices, means for reducing an oversize matrix to a gauged size, and means for punching devices in registered relation on the matrices which cooperate with means on the casting mechanism for effecting mutual registration of the matrices in the casting chamber.

19. A mechanism for treating sets of matrices for color printing including in combination a support for the matrices, gauging means adjacent to said support for determining the relative size of the designs on the various matrices, means for reducing an oversize matrix to a gauged size, means adapted to contact with a matrix for forming small holes in registered relation on the matrices which cooperate with means on the casting mechanism for effecting mutual registration of the matrices in the casting chamber, means for making in the matrices marks reproducible in the cast plates, and means for causing said marking means to impress in register with each other a series of matrices to correspondingly mark the cast plates to effect register thereof in a finishing machine.

20. A mechanism for treating sets of matrices for color printing including in combination means for positioning a transparent sheet over a matrix and means for concomitantly impressing registering means on the sheet and matrix, whereby a replica of the matrix may be produced by the aid of the registering marks in said sheet.

21. A mechanism for treating sets of matrices for color printing including in combination a matrix support, a frame, means for presenting a transparent sheet between the matrix and frame, and registering marking means mounted on the frame for concomitantly applying registering marks to the matrix and transparent sheet.

HARLAND FANKBONER.